United States Patent [19]

Kurt

[11] Patent Number: 4,952,077
[45] Date of Patent: Aug. 28, 1990

[54] HORIZONTAL-AXIS OIL-LUBRICATED CYLINDRICAL ROLLER-BEARING ARRANGEMENT

[75] Inventor: Gottfried Kurt, Rudolfstetten, Switzerland

[73] Assignee: Asea Brown Boveri Ltd., Baden, Switzerland

[21] Appl. No.: 376,527

[22] Filed: Jul. 7, 1989

[30] Foreign Application Priority Data

Aug. 2, 1988 [CH] Switzerland .................... 2896/88

[51] Int. Cl.$^5$ .................. F01M 9/06; F16C 33/66; F16H 57/04
[52] U.S. Cl. ..................... 384/462; 74/467; 184/11.1; 384/473
[58] Field of Search ............ 384/462, 465, 466, 468, 384/472, 473, 397, 401, 403, 404, 571; 74/467; 184/11.1, 11.2, 13.1

[56] References Cited

U.S. PATENT DOCUMENTS

| | | | |
|---|---|---|---|
| 1,748,972 | 3/1930 | Buckwalter | 384/404 X |
| 2,019,464 | 10/1935 | Riblet | 384/571 X |
| 2,368,963 | 2/1945 | Boden | 184/11.1 |
| 3,162,269 | 12/1964 | Reed | 184/6 |
| 3,383,937 | 5/1968 | Toenne et al. | 184/11.1 X |
| 3,804,476 | 4/1974 | Nakamura et al. | |
| 4,231,266 | 11/1980 | Nishikawa et al. | 184/11.1 X |
| 4,359,142 | 11/1982 | Schultz et al. | 184/11.1 |
| 4,480,493 | 11/1984 | Takahashi | 74/467 |
| 4,596,476 | 6/1986 | Schill et al. | 384/472 X |

FOREIGN PATENT DOCUMENTS 3026835 2/1982 Fed. Rep. of Germany .
3416971 1/1985 Fed. Rep. of Germany ...... 384/462

Primary Examiner—Thomas R. Hannon
Attorney, Agent, or Firm—Oblon, Spivak, McClelland, Maier & Neustadt

[57] ABSTRACT

A horizontal-axis oil-lubricated cylindrical roller bearing arrangement for bearing traction motors of rail vehicles, including a stationary bearing bracket, a cylindrical roller bearing having an outer ring fastened to the stationary bearing bracket, a shaft on which an inner ring of the cylindrical roller bearing is fastened, and an annular oil chamber arranged coaxially relative to the bearing and having an upper section connected with the bearing by at least an oil outlet in the chamber wall facing the bearing and connected by at least one duct with an oil-catcher device. The oil-catcher device is supplied from a gear case serving as a lubricant oil reservoir and is placed on the inside of the gear case. The oil-catcher device meters the amount of oil to be caught by the catcher device. Feeding of the lubricating oil to the annular oil chamber takes place at a level which is below the oil outlet from the annular oil chamber into the bearing. Between the annular oil chamber and the bearing is provided an annular interspace which contains means for producing a lubricating oil mist for bearing lubrication. To assure bearing lubrication after downtimes, an oil retention device for storing a reside amount of oil is provided in the interspace.

3 Claims, 1 Drawing Sheet

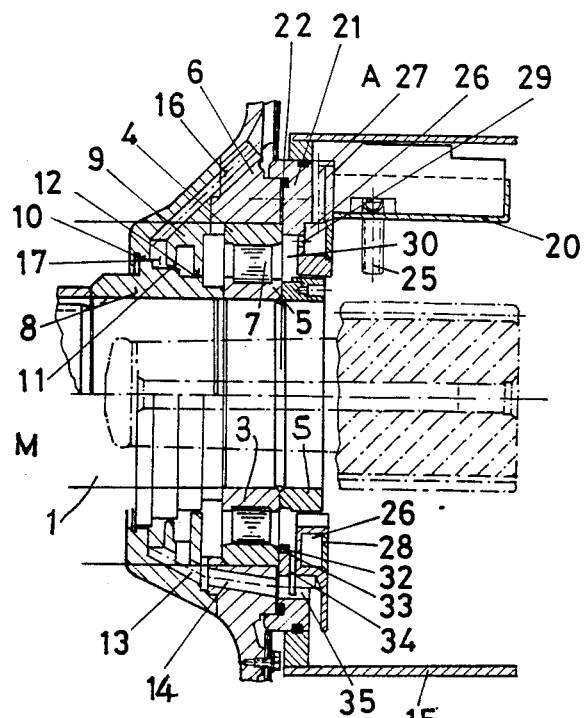
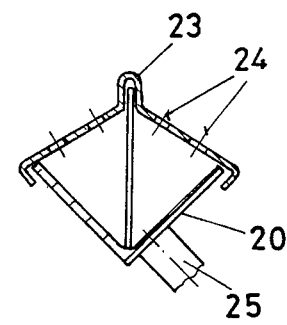
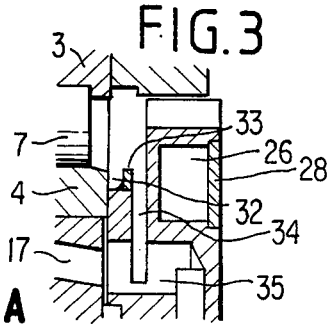
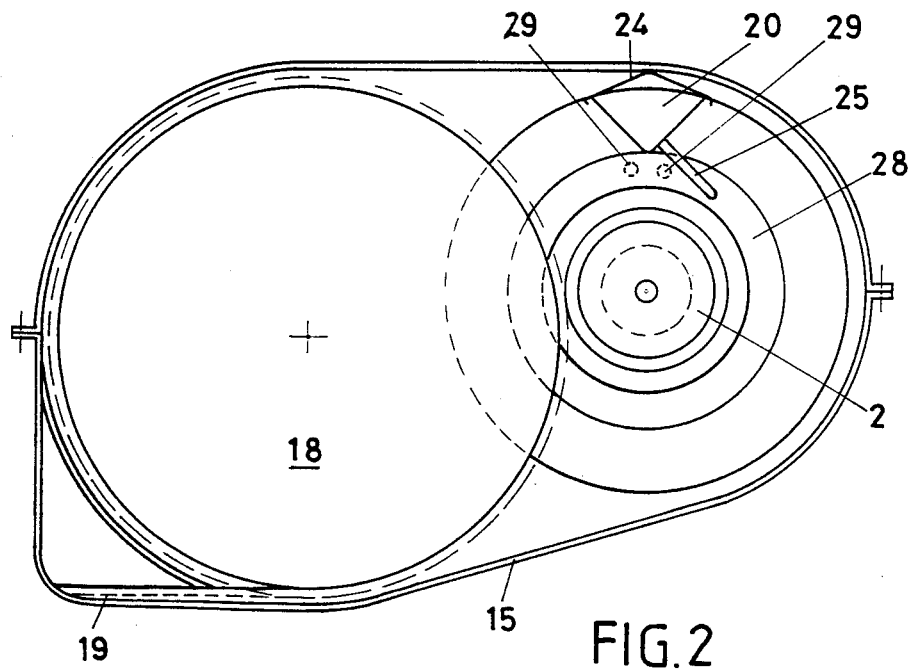

HORIZONTAL-AXIS OIL-LUBRICATED CYLINDRICAL ROLLER-BEARING ARRANGEMENT

BACKGROUND OF THE INVENTION

1. Field of the Invention

The invention relates to a horizontal-axis oil- o lubricated cylindrical roller-bearing arrangement, especially for the mounting of the rotors of travel motors on rail vehicles, with a stationary bearing plate, to which the outer ring of the cylindrical roller bearing is fastened, with a shaft on which the inner ring of the cylindrical roller bearing is fastened, with first means for the feeding of lubricating oil to the bearing and with second means for discharging the lubricating oil from the bearing back into a lubricating-oil reservoir.

2. Discussion of Background

Oil-lubricated cylindrical roller bearings are used for mountings of which the bearing characteristic $K = n_{max} \times$ mean bearing diameter exceeds the value of approximately $0.55 \times 10^6$ mm/s. Mountings with characteristics of $K < 0.8 10^6$ mm/s are preferably designed with outer-ring-guided cylindrical roller bearings of the type "NU" with oil-bath or spary-oil lubrication (see "Dubbels Taschenbuch for den Maschinenbau" ["Dubbels Manual of Mechanical Engineering"], volume 1, Springer-Verlag Berlin/Heidelberg/New York, 12th edition 1966, page 695 and summary on page 696, model h).

With bearing characteristics of $K > 0.8\ 10^s$ mm/s, this type of bearing and lubrication leads to inadmissible bearing heating, because the lubricating oil cannot be renewed constantly in the outer ring as a result of the particular type of construction. Even by the supply of such large quantities of lubricating oil, the heat occurring there still cannot be dissipated.

SUMMARY OF THE INVENTION

Accordingly, one object of this invention is to provide a novel oil-lubricated cylindrical roller-bearing arrangement, in which the bearing heating remains low even at high bearing characteristics.

In a cylindrical roller-bearing arrangement of the relevant generic type, this object is achieved, according to the invention, because the first means for the feeding of the lubricating oil have an annular oil chamber which is arranged coaxially relative to the bearing and which is connected to the bearing via at least one bore in the chamber wall facing the bearing and to an oil-catcher device via at least one line, the oil reservoir being supplied from the lubricating-oil reservoir.

The invention affords a considerable reduction of the bearing heating by means of demand lubrication. The invention is especially suitable for so-called inner-ring-guided cylindrical roller bearings, since here there is no danger that the pockets between the individual cylindrical rollers will fill up, but a sufficient throughput of lubricating oil is nevertheless guaranteed.

BRIEF DESCRIPTION OF THE DRAWINGS

The drawing illustrates an exemplary embodiment of an oil-lubricated cylindrical roller-bearing arrangement according to the invention for the rotor mounting of travel motors, by means of which the invention and its advantageous development will be explained in detail. In the drawing:

FIG. 1 shows a longitudinal section through the mounting;

FIG. 1a shows a blow-up of the oil retention return device and surrounding structure shown in FIG. 1;

FIG. 2 shows a slightly reduced cross section through the gearbox according to FIG. 1;

FIG. 3 shows an enlarged section through the oil catcher device according to FIG. 1.

DESCRIPTION OF THE PREFERRED EMBODIMENTS

The shaft 1 of a traction engine with an inserted journal pinion 2 rotates in an inner-ring-guided cylindrical roller bearing composed of an inner ring 3 of U-shaped cross section and of a smooth outer ring 4. The inner ring 3 of the cylindrical roller bearing and a bearing retaining ring 5 are shrink-fitted on the rotating shaft 1. The outer ring 4 of the bearing is arranged in the stationary bearing plate 6. The cylindrical rollers 7 are guided on the inner ring and are retained in a cage (not shown).

Towards the engine side M, a three-stage radial fine-gap gasket prevents the oil from escaping axially into the engine space. The fine-gap gasket is composed essentially of a multiply stepped rotating gasket part 8 which is fastened on the shaft 1 and which interacts with a correspondingly shaped stationary gasket part 9 fastened to the bearing plate 6 and having the sealing gaps 10, 11, 12. Excess oil flows into the gearbox 15 via oil-return bores 13, 14 in the stationary gasket part 9 and in the bearing plate 6 respectively.

A ventilating bore 16 passing through the stationary gasket part 9 and the bearing plate 6 connects the annular chamber 17 between the sealing gaps 10 and 11 to the outer space A located on the same side as the gearbox.

The gearbox 15 illustrated in FIG. 2 corresponds essentially in terms of design and functioning to the construction known, for example, from the book by Sachs "Elektrische Triebfahrzeuge" ["Electric Traction Vehicles"], second edition, volume 1, pages 366, 367, Springer-Verlag Vienna and New York 1973. In this, the large wheel 18 is encased inside the box, thus ensuring that the oil is guided by the large wheel itself to the point of engagement with the pinion 2 and that the working tooth flanks are cooled and flushed with the oil continuously and to a satisfactory degree. Even at low driving speeds, the oil conveyed by the large wheel fills the entire gearbox with an oil mist which settles on the walls of the box, runs off laterally and collects again at the bottom of the gearbox in the oil sump 19.

According to the invention, some of this spray oil is collected in an oil-catcher device 20 arranged above the pinion 2. This oil-catcher device 20 is fastened on an annular plate 21 which, with an annular gasket 22 interposed, is fastened to the bearing plate 6. It extends over the entire depth of the gearbox 15, has a cross section in the form of an upturned V and is equipped with a cover plate 23. The cover has a series of holes 24. The quantity of oil to be collected can thereby be dosed by means of the number and size of the holes 24 in the cover plate 23. At the bottom of the oil-catcher device, a pipeline 25 leads to an annular oil chamber 26 which is designed as an annular groove in the annular plate 21.

A bore 27 extending radially upwards and located in the annular plate 21 serves as a ventilating bore for the annular oil chamber 26. The annular oil chamber 26 is closed, on the same side as the pinion, by means of an annular plate 28. On the opposite side, one or more overflow bores 29 are provided in the groove bottom.

As can be seen clearly from FIG. 2, the oil inflow is offset in the circumferential direction relative to the overflow bores 29 via the line 25, specifically in such a way that the oil circulation is located underneath the oil outflow (overflow bores 29) from the annular oil chamber 26. Thus, dirt particles in the oil which are possibly present can settle in the annular oil chamber 28.

The oil collecting in the annular oil chamber 26 passes through the overflow bores 29 into an intermediate space 30 which is limited radially inwards by the bearing retaining ring 5, radially outwards by a set-back lathe-turned recess in the annular plate 21, on the pinion side by the wall of the annular oil chamber 26 and on the engine side or bearing side by the cylindrical roller bearing. In the intermediate space, the oil is atomized to form an oil mist by a swirl edge on the rotating bearing retaining ring. A small quantity of oil thereby passes into the cylindrical roller bearing and ensures the bearing lubrication. Excess oil first flows into an oil retention device 32 which is formed by making a sickle-shaped groove in the radial inner face of the annular plate 21 or as a web 33 welded to this in the lower region of the interspace 30.

After the oil retention device 32 has been filled, the excess oil passes into a run-off 34 and from there into an axial bore 35 in the annular plate 21 and there combines with the oil which is conveyed through the cylindrical roller bearing, the fine-gap gaskets 10, 11, 12 and the oil-return bores 13, 14.

In the oil retention device 32 there is always stored a small quantity of oil which ensures the lubrication of the bearing after a lengthy standstill time, before the actual oil feed via spray oil from the gearbox 15, oil-catcher device 20 and annular oil chamber 26 begins.

The oil feed to the cylindrical roller bearing is assisted by the pressure difference between the engine space M and outer space A, since, during operation, because of the very system there always prevails in the engine space a small underpressure which ensures that the oil mist in the interspace 30 is conveyed through the bearing.

Of course, the invention is suitable for other sectors of use of axle drives which require high-speed engines combined with toothed gears.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by letters patent of the U.S. is:

1. Horizontal-axis oil-lubricated cylindrical roller bearing arrangement for bearing traction motors of rail vehicles, comprising:
   a stationary bearing bracket;
   cylindrical roller bearing having an outer ring fastened to said stationary bearing bracket;
   a shaft on which an inner ring of the cylindrical roller bearing is fastened;
   an annular oil chamber arranged coaxially relative to the bearing and having an upper section connected with the bearing by an oil outlet in a chamber wall facing the bearing and connected by at least one duct with an oil-catcher device, the oil-catcher device placed on the inside of a gear case which supplies oil to said oil-catcher device and thereby serves as a lubrication oil reservoir to said oil catcher device, the oil-catcher device being structured and arranged to catch oil present in the gear;
   the oil-catcher device comprising means for metering the amount of oil to be caught by the oil-catcher device;
   means for feeding of the lubricating oil to the annular oil chamber at a level which is below the oil outlet form the annular oil chamber into the bearing;
   an annular interspace provided between the annular oil chamber and the bearing, the annular interspace including means for producing a lubricating oil mist for bearing lubrication; and
   an oil retention device for storing a residue amount of oil provided in the interspace to assure bearing lubrication after downtimes.

2. A bearing arrangement as claimed in claim 1, wherein the cylindrical roller bearing is inner-ring guided and the outer ring of said bearing is essentially smooth.

3. A bearing arrangement as claimed in claim 1, wherein the annular oil chamber is arranged in a constructional part connected to the bearing plate, but is otherwise independent.

* * * * *